Dec. 3, 1957 H. B. DRAPEAU ET AL 2,815,173
THERMOSTATIC BUTTERFLY VALVE
Filed Oct. 6, 1952 2 Sheets-Sheet 1
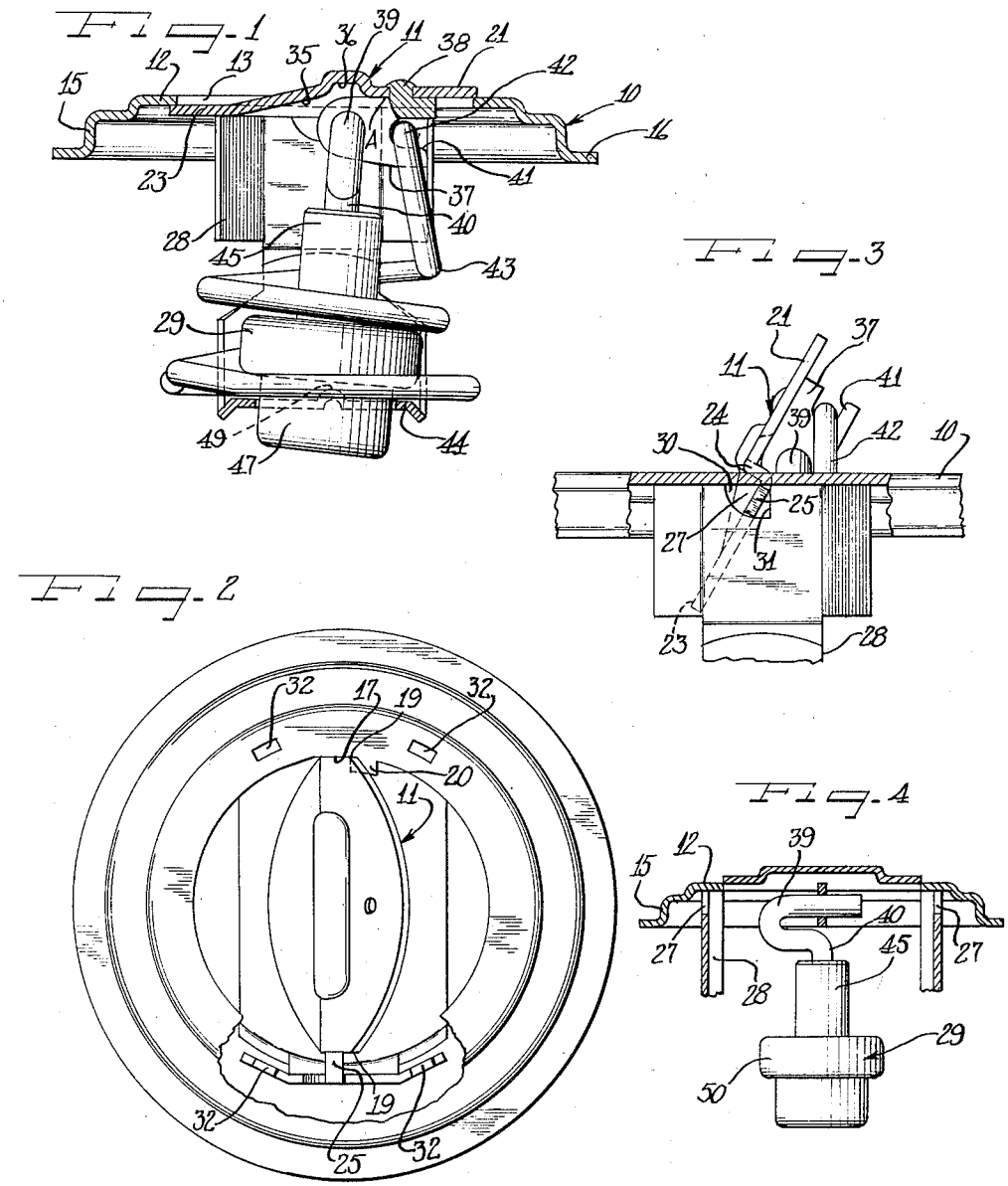
Inventors
Harold B. Drapeau
Edward G. Bohac Dec. 3, 1957 H. B. DRAPEAU ET AL 2,815,173
THERMOSTATIC BUTTERFLY VALVE
Filed Oct. 6, 1952 2 Sheets-Sheet 2
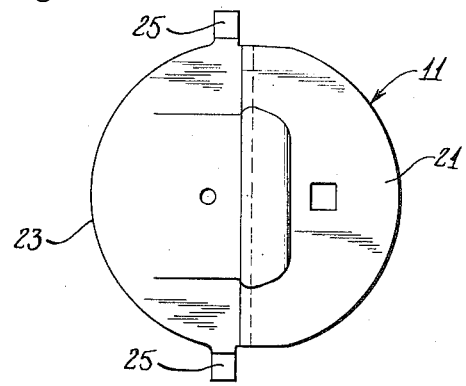
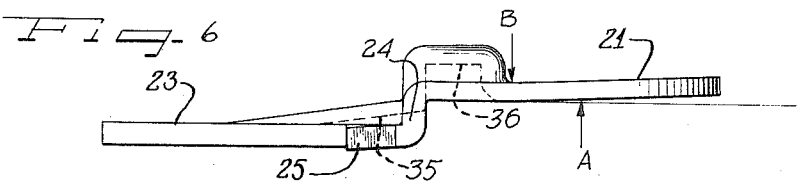
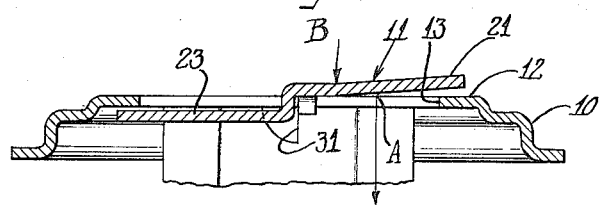
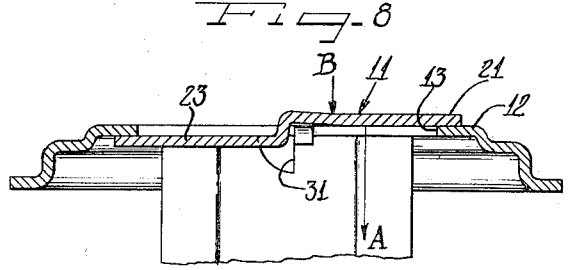
Inventors
Harold B. Drapeau
Edward G. Bohac
Attys United States Patent Office 2,815,173
Patented Dec. 3, 1957

2,815,173

THERMOSTATIC BUTTERFLY VALVE

Harold B. Drapeau, Oak Park, and Edward G. Bohac, Berwyn, Ill., assignors to The Dole Valve Company, Chicago, Ill., a corporation of Illinois Application October 6, 1952, Serial No. 313,288

3 Claims. (Cl. 236—34)

This invention relates to improvements in thermostatically operated valves of the shaftless butterfly type particularly adapted for use in the cooling systems of internal combustion engines.

An object of this invention is to provide an improved but simple butterfly type of thermostatically operated valve for the cooling system of an internal combustion engine so arranged as to reduce the leakage past the valve heretofore present in such valves and to enable a quicker warm-up of the engine.

Another object of this invention is to provide a shaftless butterfly type of thermostatic valve having edge closing contact with the valve opening so as to provide a tighter closing valve than formerly.

A still further object of our invention is to provide a thermostatically operated shaftless butterfly valve particularly adapted for use in cooling systems for internal combustion engines wherein the valve is movable about a shifting fulcrum and has edge contact with the valve opening when in a closed position.

A still further object of our invention is to provide a shaftless butterfly type of valve wherein the valve pivots on opposite sides of the valve opening and wherein the pivot is so arranged as to provide an unobstructed valve opening.

A still further object of our invention is to provide a simple novel and improved form of shaftless butterfly type of valve for use in cooling systems of internal combustion engines so arranged as to free the pivotal area of the valve from dirt catching surfaces.

Still another object of our invention is to provide a simple and efficient form of shaftless butterfly type of valve having an unobstructed valve opening when the valve is open and to eliminate sticking of the valve by so arranging the pivotal area of a valve as to be self-cleaning and free from the dirt catching surfaces heretofore present in valves of this type.

Still a further object of our invention is to provide a shaftless butterfly type of valve having non-parallel wing surfaces extending in opposite directions from the pivotal area thereof.

A still further object of our invention is to provide a shaftless butterfly type of valve having two oppositely extending wing surfaces and an intermediate angular surface joining the wing surfaces together, and spacing the surfaces so one will engage the bottom and the other will engage the top of the casing defining the valve opening, and inclining the surface engaging the top of the casing with respect to the surface engaging the bottom of a valve opening so that the valve closing spring will positively engage the lower surface with the bottom of the valve opening and fulcrum the upper surface downwardly about the edge of the valve casing into tight engagement with the top surface thereof.

A still further object of our invention is to provide a thermostatically operated shaftless butterfly valve in which the usual ears forming the pivotal mounting for the valve on the valve casing have been eliminated, and wherein the valve is pivotally mounted in spaced relation with respect to the valve casing with one wing surface of the valve inclined with respect to the other, so as to provide a shifting fulcrum for the valve shifting from the center of the opening outwardly along the edges thereof upon valve closing movement so as to provide a tighter closing valve than formerly.

A still further object of our invention is to provide a shaftless butterfly valve in which the valve pivots to a closing position about a fulcrum shifting from beneath the valve opening adjacent the center thereof to the top surface of the valve opening spaced from the center thereof, to positively engage the lower wing surface of the valve with the bottom of the valve opening as the upper wing surface of the valve flexes into engagement with the top of the valve opening.

These and other objects of our invention will appear from time to time as the following specification proceeds and with reference to the accompanying drawings wherein:

Figure 1 is a transverse sectional view taken through a butterfly valve constructed in accordance with our invention;

Figure 2 is a top plan view of the valve shown in Figure 1, showing the valve in an open position and showing certain parts of the valve casing broken away, in order to show the pivotal support for the valve;

Figure 3 is a fragmentary view in side elevation showing the valve in an open position, with certain parts of the valve casing broken away to illustrate the pivotal support for the valve;

Figure 4 is a fragmentary sectional view of the valve, showing the valve in a closed position;

Figure 5 is a top plan view of the butterfly valve;

Figure 6 is a view in side elevation of the valve shown in Figure 5;

Figure 7 is a diagrammatic view illustrating the shifting fulcrum mounting for the butterfly valve element; and Figure 8 is a view somewhat similar to Figure 7 but showing the valve element in a fully closed position.

As shown on the drawings:

In the embodiment of our invention illustrated in the drawings, an annular valve casing 10 is shown. This valve casing may be suitably attached in any desired manner to a hose connection or water jacket structure of an internal combustion engine, through which cooling fluid is flowing, to control the temperature and flow of the cooling fluid by a butterfly valve, indicated generally by reference character 11, and herein shown as being a butterfly valve of the shaftless type.

The casing 10 may be made from a metallic stamping, stamped from a sheet or plate of brass or other suitable material, and is herein shown as having a flat upper annular surface or portion 12, the inner margin of which forms a valve opening 13. The casing 10 also has a stepped wall portion 15 terminating into an annular flange 16 which may abut a shouldered portion (not shown) of the water jacket structure or hose connection, to secure the valve in place in the cooling system.

The valve opening 13 is shown in Figure 2, as being generally circular in form, having diametrically opposed flattened surfaces 17, 17 abutting corresponding flattened edge surfaces 19, 19 of the butterfly valve 11. The valve casing also has two opposed nibs 20, 20. Each nib 20 is shown as being at one edge of a flattened surface 17 and is turned downwardly to extend inwardly of the valve casing in an upstream direction and react against the under surface of the valve and form a stop therefor when the valve is in an extreme open position.

The valve 11 may likewise comprise a metallic stamping and, except for the fact that its wing surfaces are non-parallel, may be somewhat similar to the valve shown in the Brown Patent No. 2,493,736, dated January 10, 1950. The valve 11 is shown as comprising two vertically offset substantially planar wing portions 21 and 23 extending in non-parallel relation with respect to each other in opposite directions from an intermediate portion 24 extending at an angle to the planes of said wing portions, and herein shown as being at substantially right angles with respect thereto. The height of the intermediate angular portion may be slightly greater than the thickness of the annular open portion 12 of the casing defining the valve opening 13 as will hereinafter more clearly appear as the specification proceeds, and is such that one wing portion 21 is disposed to lie along the top side of the annular portion 12 and the other wing portion 23 is disposed to engage the bottom side of the annular portion 12, when the valve is closed, as shown in Figures 1 and 8. In addition, the overall area of the valve 11, which is of a general disk-like form, with the exception of the attachment for the operating means therefor, is such that when the valve is in a closed position, as shown in Figures 1 and 8, the wing portions will extend beyond the edge of the valve opening 13, along half of the top edge of the annular portion 12 and along half of the bottom edge thereof, to close off the flow of fluid through the said opening. Two aligned ears 25, 25 are shown as extending laterally from the lower wing portion 23 of the valve 11 at opposed points beyond the margins thereof and beneath the margins of the valve opening 13, when the valve is in position in the valve casing.

The ears 25, 25 are shown in Figures 2 and 3 as extending from the wing portion 23 beneath the bottom surface of the flat annular portion 12 of the casing 10 for rocking engagement with the under surface thereof. The ears 25, 25 also extend through upwardly opening recessed portions or slots 27, 27 of a saddle or support bracket 28 for a power thermostatic element 29. As herein shown, the slots 27, 27 each open to the top of the saddle 28 and have an arcuate bottom surface 30 forming retainers for the ears 25, 25 to retain the valve 11 to the casing. The slots 27, 27 each have a wall 31 perpendicular to the annular surface 12. The arcuate surface 30 is shown as extending from the lower margins of the wall 31 upwardly to the top of the saddle 28.

The slots 27, 27 thus form a retaining means for the valve element 11, as the valve is moved to a closed position by a biasing spring 43. The fit between the ears 25, 25 and the slots 27, 27 is relatively loose to provide a free connection accommodating the ears 25, 25 to rockingly engage the bottom surface of the annular portion 12 of the valve casing as the valve is pivoted to the position shown in Figure 7 by the spring 43. The saddle 28 is shown as having spaced upwardly extending nibs 32, 32 extending through corresponding apertures in the annular surface 12 of the valve casing 10 and spun or peened thereto.

As shown in Figure 6, the wing portion 23 is generally horizontal when the valve is closed and the valve casing is in a horizontal position with the opening 13 extending vertically therethrough, while the wing portion 21 has a base portion extending to point B which is parallel to the portion 23 and has an inclined portion extending therefrom inclined from point B at a slight upward angle with respect to the base portion thereof during initial valve closing movement and until the valve is fully closed, as will hereinafter be more fully described as this specification proceeds. The valve element 11 is also provided with recessed portions 35 and 36 in the bottoms of the wing portions 23 and 21, respectively. These recessed portions may be formed in said wing portions by stamping to accommodate the inner end portion of a yoke or bracket 37. The yoke 37 is shown as extending at right angles to the intermediate portion 24 and as being secured to the wing portion 21 by a nib 38 extending upwardly therefrom. The yoke 37 is apertured adjacent its inner end at a point offset from the center of the valve to receive a hooked end 39 of a piston or plunger 40 of the power thermostatic element 29, for opening and closing the valve, as will hereinafter more clearly appear as this specification proceeds. The yoke 37 also has an outwardly opening slot 41 formed therein, to which is attached a hooked end 42 of a conical spring 43. The spring 43 is suitably secured at its opposite end to a bridge 44 of the bracket 28, to bias the valve to a closed position, as in application Serial No. 181,251 filed by Harold B. Drapeau on August 24, 1950, now Patent No. 2,656,-113 and entitled "Thermostatic Valve." It therefore is not necessary to describe this spring and its mounting further.

The piston 40 is extensible from a cylinder 45 of the power thermostatic element 29, herein shown as extending through and as being rockingly mounted adjacent its lower end on the bridge 44 of the saddle 28.

The bridge 44 is shown as being upset adjacent the margins of its central opening, through which the power element extends, at diametrically opposed points, to form rounded bearing nibs 49, 49 upon which rockingly rests an enlarged outer ring portion 50 of the power temperature responsive element 29, enabling said element to rock and follow the yoke 37 upon valve opening and closing movement. The bridge 44 also forms a seat for the spiral coil spring 43.

The power thermostatic element 29 may be of a well known form of power element type utilizing a temperature responsive element in the form of a pre-formed body contained in a casing, to extend the piston from the cylinder with a relatively high degree of pressure, as disclosed in the Vernet Patents Nos. 2,259,846, dated October 21, 1941 and 2,368,181, dated January 30, 1945, and is no part of my present invention so need not herein be described further.

Referring now in particular to Figures 7 and 8, diagrammatically illustrating our invention in an exaggerated form, Figure 7 illustrates the movement of the valve 11 into a partially closed position. The force of the spring 43 closing the valve is exerted at point A on the wing portion 21. This exerts a downward pull on the valve and pivots the valve about the point of engagement of the ears 25, 25 with the bottom surface of the annular portion 12 until it reaches the partially closed position shown in Figure 7, the resistance of the piston 40 to retractibly move with respect to the thermostatic element, maintaining the ears 25, 25 in rocking engagement with the bottom surface of the annular portion 12.

In the position shown in Figure 7 there is clearance between the ends of the wing portions 21 and 23, and opposite sides of the annular planar surface 12. There is, however, an area of contact of the valve on the valve seat from the intermediate portion 24 to the point B. The spring 43 will then begin to rotate the valve about point B until the end of the top surface of the wing portion 23 contacts the bottom of the annular surface 12. At this stage of valve closing, rotation of the valve about the point B has established clearance between the top of the annular portion 12 and the under surface of the wing portion 21 adjacent the intermediate portion 24. Continued force on the valve at point A by the spring 43 will tend to flex the valve from point B and along the wing portion 23 and seal the wing portions 21 and 23 to the valve seat formed by the top and bottom surfaces of the annular planar surface 12.

The clearance in the closed position of the valve and that portion of the upper surface of the annular planar portion 12 adjacent thereto and the portion of the valve adjacent the intermediate portion 24 will accommodate the passage of fluid thereby and maintain the space at the bottom of the wing portion 21 in the area of the nibs 20 clean. The ears 25, 25 also being out of engagement with the arcuate surfaces 30, 30 of the slots 27, 27 will provide passageway spaces for the circulation of liquid through the slots 27, 27 to maintain said slots free from sediment. The non-parallel wing portions of the valve thus provide a tighter closing valve with less leakage of coolant past the valve than in former shaftless butterfly valves in which dirt entrapped in the vicinity of the pivot prevents tight closing of the valve, and entirely eliminate the susceptibility of dirt to lodge at the hinge point of the valve.

It should be here understood that while we have herein shown the shaftless buterfly valve connected to an earless valve casing, that where the wing portions of the valve are non-parallel, the freedom from sticking of the valve is also attained where the casing is provided with the usual ears as in application Serial No. 181,251 filed by Harold B. Drapeau on August 24, 1950, now Patent No. 2,656,113 and entitled "Thermostatic Valve."

It may be seen from the foregoing that a novel and improved form of butterfly valve has been provided wherein the usual ears forming the pivot for the butterfly valve element have been eliminated from the valve casing and wherein the casing is so constructed as to accommodate the uninterrupted flow of fluid therethrough when the valve is open, and that the pivotal area of the valve is free from dirt catching surfaces and is continually washed by the circulating fluid to assure a free opening and closing valve, even though the fluid in the cooling system may be dirty.

It may further be seen that clearance is provided in the pivotal area of the valve so that during valve closing movement, the fulcrum shifts from a position adjacent the center of the valve opening to a location spaced outwardly therefrom to provide the required leverage for tightly closing the valve and maintaining the valve in a closed position, and to free the pivotal area of the valve to accommodate fluid to wash thereby.

It will be understood that modifications and variations may be effected without departing from the scope of the novel concepts of the present invention.

We claim as our invention:

1. In a valve structure, a casing having a flat annular portion, the inner margin of which defines a valve opening, a shaftless butterfly valve having oppositely projecting ears adjacent the pivotal area of the valve having loose rocking engagement with said casing, and having two offset wing portions and an intermediate portion spacing said wing portions apart a distance slightly greater than the thickness of said flat annular portion of said casing, said intermediate portion of said valve spacing an upper of said wing portions to overlap a portion of the top of said flat annular portion of said valve casing and spacing a lower of said wing portions to underlap a portion of the bottom of said flat annular portion of said valve casing, the underlapping portion of the lower of said wing portions being flat and extending parallel to the underlapped portion of the valve casing when the valve is closed, and the overlapping portion of the upper of said wing portions having a flat base portion adjacent said intermediate portion and extending parallel to the underlapping portion of the lower of said wing portions and having a flat upwardly bent portion extending from said base portion, and a tension spring connected to the upper of said wing portions within the limits of said upwardly bent portion of the upper of said wing portions, to pivot the valve about the bottom of said flat annular portion during the initial stage of valve closing movement, and to pivot said valve about the top of said flat annular portion adjacent the juncture of said flat upwardly bent portion to said flat base portion toward the end of valve closing movement.

2. In a valve assembly, a casing member having a flat annular portion defining a valve opening, a support member extending from said casing member and having aligned upwardly opening slots on each side of said valve opening and opening to the underside of said flat annular portion, a shaftless butterfly valve having oppositely projecting extremities adjacent the pivotal area of the valve, projecting into said slots, and having two offset wing portions extending in opposite directions from the pivotal area of the valve and offset a distance slightly greater than the thickness of said flat annular portion of said casing, one having engagement with a portion of the bottom surface of one-half of said flat annular portion and the other having engagement with a portion of the top surface of the other half of said flat annular portion, the wing portion engaging the top surface of the other half of said flat annular portion having a portion adjacent the pivotal area of the valve extending parallel to the wing portion engaging the bottom surface of one-half of said flat annular portion and having an upwardly bent portion extending from said parallel portion, and a return spring connected with said upwardly bent portion of said valve and first pivoting said valve about the bottom surface of said flat annular portion during a part of valve closing movement and then pivoting said valve about the juncture of said upwardly bent portion with said parallel portion of the wing portion engaging the top of said annular surface, and slightly raising said parallel portion of said wing portion engaging the top surface of said flat annular portion above said flat annular portion, to accommodate the circulation of fluid to free the pivotal area of the valve from particles of dirt.

3. In a thermostatic valve, a valve casing having a butterfly valve rockingly mounted thereon, said valve casing having a flat annular portion defining a port opening to be controlled by said valve and having a seating member spaced from said port opening, a temperature responsive element having a casing rockable on said seating member and having a piston extensible with respect to said casing in response to temperature variations, a pivotal driving connection between said piston and said butterfly valve element, a coil spring seated on said seating member for closing said butterfly valve and returning said piston with respect to said casing, said butterfly valve having opposed wing portions, one wing portion being engageable with the underside of said flat annular portion and the other wing portion being engageable with the outer side of said flat annular portion, said other wing portion having a portion adjacent the rocking mounting of the valve on said casing extending parallel to said one wing portion and being engageable with the outer side of said flat annular portion and having an angular portion extending from said parallel portion and being of a substantially greater length than the length of said parallel portion, and said spring having connection with said angular portion of said other wing portion and pivoting said valve about its rocking mounting on said casing for a portion of valve closing movement and then fulcruming said valve about the outside of said flat annular portion of said casing about the juncture of said angular portion with said parallel portion during a latter part of valve closing movement and flexing said angular portion of said other wing portion into engagement with the outside of said flat annular portion during the balance of valve closing movement.

References Cited in the file of this patent

UNITED STATES PATENTS

| | | |
|---|---|---|
| 1,034,531 | Stump | Aug. 6, 1912 |
| 1,242,621 | Watkins | Oct. 9, 1917 |
| 1,811,366 | Palm | June 23, 1931 |
| 2,222,826 | Ward | Nov. 26, 1940 |
| 2,282,532 | Shenk | May 12, 1942 |
| 2,493,736 | Brown | Jan. 10, 1950 |
| 2,569,359 | Vellinga | Sept. 25, 1951 |